United States Patent Office 3,458,372

Patented July 29, 1969

3,458,372
POWDERLESS ETCHING

Paul Borth, Park Forest, and Joseph McKeone, Hazelcrest, Ill., assignors to Photo-Engravers Research Institute, Incorporated, Savannah, Ga., a corporation of Georgia No Drawing. Filed Nov. 12, 1965, Ser. No. 507,541
Int. Cl. B41c *1/00*; C09k *3/00*
U.S. Cl. 156—14 17 Claims

ABSTRACT OF THE DISCLOSURE

A ferric chloride etching solution containing a monocarboxylic acid additive and a method for utilizing this solution for etching metals such as copper and brass wherein the need for a film forming agent in the bath is eliminated and when a film forming agent is incorporated in the bath, the need for replenishing the film forming agent is substantially reduced.

This invention relates to improvements in a powderless etching bath for photo-engraving copper or brass. More particularly, this invention relates to additives which when placed in a powderless etching bath which may or not contain a film-forming agent produces an etching bath having new and improved properties when utilized in the photo-engraving of copper or brass.

Photo-engraving copper printing plates, which can be copper or brass, are made by depositing a photo-sensitive film on the plate, impressing on the film the image to be printed by exposing the film to light passed through a negative of the image, removing the unexposed film (which overlies the image area), and providing the remainder of the film (which serves to define the image area) in a hardened and acid-resistant condition by chemically treating or by baking this portion of the film. The plate is then contacted with an etching solution containing ferric chloride, and this solution attacks the copper of the image area, but not the copper covered by the acid-resistant coating, whereby the image is provided in relief on the plate.

Heretofore, one of the problems encountered during the etching procedure has been sidewall etching and undercutting. As the depth of the etch increases the sides of the metal supporting the resist are exposed to etching solution tending to undercut the resist along the sidewall edges and often resulting in a printing surface which is not a true representation of the image transferred to the sensitized metal. Recently, means have been taught for protecting the plate from such undercutting by incorporating various film-forming agents in the ferric chloride etching bath. These film-forming agents serve to diminish undercutting by forming an etch resistant film on the surface of the plate, thereby giving a protective film on the sidewalls of the resist, and protecting the same from further etching. However, in order to continue the etching process, it is necessary to remove the film from the bottom portions of the area to be further etched in a manner so as not to remove the film from the sidewall areas to be protected. Conventionally this film removal is accomplished by some form of mechanical action, such as splashing of the etching solution against the plate, a brushing action, or forced flow of the solution against the plate. In utilizing the splashing technique, the etching solution travels a course substantially perpendicular to the image area and upon striking the image area, abrades away any film which has formed. The splash, of course, also strikes the sidewalls but the angle of incidence with the sidewalls is such that the protective film on the sidewalls is not removed.

The following chemicals have been taught to be useful as film-forming agents for ferric chloride etching baths. These compounds and their use are disclosed in detail in the patents indicated which are herein incorporated by the reference.

(1) Formamidine disulfide, salts of formamidine disulfide, and salts of substituted formamidine disulfide as taught in U.S. Patent 3,033,725 issued May 8, 1962 to Daugherty et al. Particularly preferred is formamidine disulfide hydrochloride, although other salts of formamidine disulfide such as formamidine disulfide hydroiodide and formamidine disulfide picrate can be employed. Also suitable are salts of a disulfide of a substituted formamidine in which one or more hydrogen atoms of the formamidine group are substituted by an alkyl group or an aryl group, such as diphenyl, dibutyl, diisopropyl, etc. The term "formamidine disulfide compound" denotes all the above compounds. In general, the bath will include ferric chloride in a range of from about 200 to about 460 grams per liter of the bath and a formamidine disulfide compound in a concentration of from about 0.5 to 10 grams per liter.

(2) Thiourea compounds such as thiourea, a dimer of thiourea, ethylene thiourea, and substituted ethylene thiourea such as disclosed in U.S. Patent No. 2,746,848 Jones, and in U.S. Patent No. 3,148,100 Elston. In general, from about 0.5 to about 10 grams of the thiourea compound are added per liter of bath.

(3) Thiourea compounds such as those noted above in combination with the formamidine disulfide compounds noted above as is described in U.S. Patent No. 3,148,100.

While the use of the above film-forming agents in combination with a ferric chloride etching bath has represented a significant step forward in the art, one problem which is encountered through the use of ferric chloride etching solution is that the etching rate of these solutions (the depth of the etch per unit time) is slow. This makes this etching procedure costly and time-consuming which is extremely disadvantageous, especially where a continuous etching process is desired. Furthermore, it has been found that the slow etching rate of the ferric chloride solution enhances, in many cases, sidewall etching and undercutting which significantly reduce the image area in relief. It has been found that in certain cases of engraving where only a small etched depth is necessary, such as the engraving of printed circuits, increased etching rates can eliminate the necessity for incorporating film-forming agents in the etching bath. Therefore, it has long been desired in the art to provide a means whereby the rate of etching utilizing ferric chloride etching baths would be increased.

While certain additives have been somewhat successful in increasing the etch rate of ferric chloride etching baths, these additives have, in many cases, accelerated the reduction in effectiveness of these film forming agents, in that there is a considerable reduction in effectiveness of these agents, particularly if the bath has stood unused for some time. The reduced effectiveness of the film-forming agent often requires replenishment of the bath by the addition of additional film-forming agent to maintain the film-forming agent in an effective concentration in the bath. Naturally, this depletion reduces the efficiency of the bath. Also, the replenishment of these agents in the bath represents a dislocation in the continuous etching operation required in industrial use. Furthermore, many of these film-forming agents are expensive and the continual replenishment of etching baths with film-forming agents has proved costly. It has long been desired in the art to find a method for reducing the depletion of the film-forming materials so as to significantly extended the working life of the bath and to materially reduce the amount of replenishment of the film-forming materials necessary to maintain the bath in optimum operating condition. Therefore, the use of these additives which increase the etch rate is very problematical in the etching field due to their tendency to accelerate the depletion of the effectiveness of the film-forming agent. Hence, it has long been desired in the art to find additives which increase the etch rate of ferric chloride etching bath without deleteriously affecting the effectiveness of the film-forming agent in the bath.

Therefore, it is an object of this invention to provide a ferric chloride etching bath having an increased rate of etching without increasing or accelerating the effectiveness of the film-forming agent in the bath.

It is a further object of this invention to provide a method for etching copper or brass whereby an increased rate of etching is obtained without increasing or accelerating the decomposition of the film-forming agent in the bath.

It is a further object of this invention to provide a method for etching copper or brass with a ferric chloride etching bath where in certain cases the need for a film-forming agent is eliminated.

It is a further object of this invention to provide a ferric chloride etching bath containing a film-forming agent wherein the normal depletion of the film-forming agent upon continued use is substantially reduced.

It is a further object of this invention to provide a method for etching copper with a ferric chloride etching bath containing a film-forming agent, wherein the need for replenishing the film-forming agent after successive use is substantially reduced.

These and other objects of this invention will become apparent from the following detailed disclosure of the invention.

We have unexpectedly discovered that by incorporating into a ferric chloride etching bath containing an aqueous solution of ferric chloride as an additive, a compound selected from the group consisting of halogenated monocarboxylic acid containing from about 2 to about 4 carbon atoms and having at least one halogen radical substituted on the alpha carbon atom, cyano substituted monocarboxylic acids containing from about 2 to about 4 carbon atoms, alkali and alkaline earth, metal salts of monocarboxylic acids containing from about 1 to about 4 carbon atoms, alkali metal salts of halogenated monocarboxylic acids containing from about 2 to about 4 carbon atoms, propinionic acid and mixtures thereof, an etching bath is provided which has a greater etching rate than has been hereinbefore provided by conventional ferric chloride etching baths without having any deleterious affect on the depletion rate of the film-forming agent contained therein. Furthermore, in some cases where a film-forming agent is present in the bath, particularly where the additives is an alpha halogenated or cyano substituted monocarboxylic acid containing from about 2 to about 4 carbon atoms, an alkali metal salt of halogenated monocarboxylic acid containing from about 1 to about 4 carbon atoms, the normal depletion in rate of the film-forming agent will be substantially reduced, so that the effective concentration of the film-forming agent will be maintained in the bath for longer periods of time than realized with conventional baths. Furthermore, by the increased etching rate obtained by incorporating the aforementioned additives in ferric chloride etching baths, it is possible, in certain uses, wherein only small etching depths are required, such as in etching printed circuits, to eliminate the use of a film-forming agent altogether. Hence by means of incorporating the aforementioned additives in ferric chloride etching baths, the time consuming and costly step of replenishing or supplying film-forming agents in powderless ferric chloride etching compositions can be substantially eliminated. Additionally, by means of the increased etching rate obtained by the composition of this invention, etching of copper or brass can be performed continuously in an efficient and economical manner.

The phenomena whereby increased etching rates without deleteriously affecting or accelerating the depletion of film-forming agents, even after continued use of etching baths occur, is not completely understood; however, these beneficialy results are directly attributable to the incorporation of these additives in a powderless ferric chloride etching bath. The unique results of this invention are only achieved by means of utilizing these aforementioned additives in a ferric chloride etching bath. It has been found that if beta chloro propionic acid or formic acid is utilized, the improved results obtained by the etching composition of this invention will not be provided.

The proportion of the aforementioned additives present in the etching bath can be from about 1% to about 20% by weight, based upon the weight of the bath, preferably from about 2% to about 12% by weight, based upon the weight of the bath. Smaller amounts than 1% by weight can be used, as any amount will provide some beneficial results, but in general, at least 1% is necessary for substantial results to be achieved. Larger amounts than 25% of these aforementioned additives can be used; ordinarily this will not be desirable due to the lack of increased effectiveness achieved by utilizing such high amounts.

In accordance with this invention any conventional alpha halogenated or cyano substituted monocarboxylic acid containing from about 2 to about 4 carbon atoms can be utilized as the additives in accordance with this invention to produce and improve etching rate without deleteriously affecting the depletion rate of the film-forming agent in the bath. Among the many alpha halogenated or cyano substituted monocarboxylic acids containing from about 2 to about 4 carbon atoms are included mono chloracetic acid, dichloroacetic acid, monobromoacetic acid, di bromo acetic acid, tribromo acetic acid, alpha chloro-propionic acid, alpha chloro-beta chloro propionic acid, alpha trichloro-beta chloro propionic acid, alpha bromo beta chloropropionic acid, moniodo acetic acid, alpha iodo propionic acid, alpha iodo-beta bromo-propionic acid, alpha chloro-n-butyric acid, alpha-chloro-beta chloro iso butyric acid, alpha cyano-beta cyano-isobutyric acid, alpha cyano-propionic acid, etc.

Any of the conventional alkali metal salts such as sodium, potassium of the halogenated mono carboxylic acid containing from about 1 to about 4 carbon atoms can be utilized as additives in accordance with this invention to produce the aforementioned beneficial results. In utilizing the alkali salts of the halogenated carboxylic acids as additives it has been found that good results are achieved with salts of the halogenated acids which do not contain an alpha halogenated radical as well as with the salts of the acids which contain an alpha halogenated carbon atom. Furthermore, it has been found that the halogenated and cyano-acids as well as their alkali metal salts, particularly halogenated acetic acid, alpha halogenated propionic acid, cyano acetic acid and the alkali metal salts thereof, exhibit the phenomena, where the etching bath contains a film-forming agent, of substantially reducing the depletion rate of the film-forming agent in the bath. In this manner the effective concentration of the film-forming agent will be maintained in the bath for a longer period of time than realized with conventional baths.

In accordance with this invention, any conventional alkali or alkaline earth metal salts such as the barium, calcium, magnesium, sodium, potassium, lithium salts of a carboxylic acid containing from about 1 to about 4 carbon atoms can be utilized as the additive to substantially increase the etching rate of the bath without deleteriously affecting the depletion rate of the film-forming agent when it is utilized in the bath. Among the acids whose alkali metal or alkaline earth metal salts may be utilized to produce the improved results of this invention are included formic, acetic, propionic and butyric acid. Furthermore, it has been found that by utilizing propionic acid in its neutral form as the additive in accordance with this invention, the aforementioned beneficial results are produced. Additionally, when the alkali metal salts of the carboxylic acid containing from about 1 to about 4 carbon atoms are utilized as additives in a bath containing a film-forming agent, they exhibit the phenomena of substantially reducing the normal depletion rate of the film-forming agent in the bath. In this manner the effective concentration of the film-forming agent will be maintained in the bath for longer periods of time when realized with conventional etching baths.

Any of the conventional film-forming agents which are utilized in powderless etching baths such as those heretofore mentioned may be incorporated into the etching bath of this invention. If it is desired to incorporate a film-forming agent into the etching bath, the film-forming agent is usually present in the bath in an amount of from about 0.5 to about 10 grams per liter of etching solution, preferably from about 1 to about 5 grams per liter. Less than 0.1 gram per liter can be used. Greater than 10 grams of the film-forming agent may be utilized if desired, the only upper limit being the solubility of the film-forming agent in the bath. However, since no added beneficial results are achieved by utilizing amounts greater than 10 grams per liter, amounts greater than 10 grams per liter are seldom utilized.

The etching bath is an aqueous ferric chloride etching solution, as it is known in the art for etching photo-engraving copper, whose concentration can be from about 20° to about 55° Bé. and is preferably about 30° Bé. Any conventional additives which are known to improve the efficiency of etching baths may be incorporated in the etching bath of this invention such as the modifying agents disclosed in U.S. Patent No. 3,161,552.

To carry out the etching process utilizing the bath of this invention, any conventional etching machine may be utilized. Among the many conventional etching machines which may be utilized in etching copper or brass with the composition of this invention there may be utilized an etching machine of the type disclosed in Ser. No. 288,802, Borth, filed June 18, 1963 now Patent 3,271,282, Master PC–32 sold by Master Etching Machine Company of Wyncote, Pa. "Kopr-Matic" manufactured by Chemco Photo Products and "Empire" manufactured in Denmark by Brdr. Luth.

The following examples are given to further illustrate the present invention. The scope of the invention is not, however, meant to be limited to the specific details of the examples.

Examples 1 through 10

Examples 1 through 10 demonstrate the improved etching rate that is obtained by means of incorporating the additives of this invention in etching baths which do not contain any film-forming agent.

In Examples 2 to 10, separate etching baths were prepared by incorporating the additives listed in Table I in an aqueous solution of 30° Bé. ferric chloride. The additives were incorporated in the 30° Bé. ferric chloride solution by mixing a sufficient quantity of the additive to provide 0.03 mole of the additive per liter of 30° Bé. ferric chloride. The Example 1 no additive with incorporated in the aqueous 30° Bé. ferric chloride solution.

In Examples 1 through 10, the etch rate was determined in the following manner: Work specimens were prepared by coating plates of photo-engraving copper with a commercial photo-resist material sold by Chemco Photo Products Company under the trade name of "KOPR-TOP". Each of the copper plates were then exposed to a photographic negative having an image of a test object pattern, consisting of two 120 lines per inch half-tone grey scales plus additional lines of width of 0.03 mm. and 0.1 mm. and containing type of different sizes and styles. The test image was photo-printed by exposing each of the coated plates to the actinic radiation from an arc lamp. After exposure of the resist, the unexposed portion of the resist film on each of the plates were removed by placing the plates in warm water. After placing the plates in warm water, the coating on each of the plates was dried by infra-red radiation and baked to an acid resistant condition by heating each of the plates to 650° F. In this manner the test image was developed.

After the test image was developed on each of the specimens, each of the plates were subjected to contact with one of etching solutions of Example 1 through 10. The etching solutions were applied to the photo-printed copper plate by means of a Master PC–32 etching machine sold by Master Etching Machine Company, of Ambler, Pa. The etching solutions were splashed upwardly against the work specimen by means of this machine, having 8" diameter paddles operating at 580 r.p.m. This splashing was carried out at 80° F. for about 5 minutes; each of the plates during this period was maintained 8 inches above the paddle wheel periphery of the Master etching machine. After this period, the machine was stopped and the depth of etching was measured in an open line area using "Depthometer" and the etch rate given in Table I was computed. This etch rate was determined by dividing the depth of the etch by the time in which it took to get this depth, which in this case was five minutes.

TABLE I.—RELATION OF ADDITIVE TO ETCH RATE OF AN AQUEOUS 30° BÉ. FERRIC CHLORIDE SOLUTION

| Example | Additive | Etch rate (inch per minute |
|---|---|---|
| 1 (Control) | None | 0.0010 |
| 2 | Monochloro acetic acid | 0.0013 |
| 3 | Bromo acetic acid | 0.0013 |
| 4 | Di bromo acetic acid | 0.0014 |
| 5 | Alpha chloro propionic acid | 9.0013 |
| 6 | Sodium salt of monochloro acetic acid | 0.0013 |
| 7 | Sodium formate | 0.0013 |
| 8 | Sodium propionate | 0.0014 |
| 9 | Propionic acid | 0.0014 |
| 10 | Alpha chloro propionic acid | 0.0012 |

As seen from the results in Table I, the additives of this invention increase the etch rate by at least twenty percent, even without the use of a film-forming additive, when utilized in an etching bath. This is seen by comparing the results of Example 1 where no additive was utilized with that of Examples 2 through 10 where the additives of this invention were utilized.

Examples 11 through 26

Examples 11 through 26 demonstrate the improved etching rate that is obtained by means of incorporating the additives of this invention in etching baths containing film-forming agents.

To separate 30° Bé. ferric chloride aqueous etching solutions, a film-forming composition containing the following ingredients was added in the concentrations set forth in Table II below.

| Components: | Parts by weight |
|---|---|
| Formamidine disulfide dihydrochloride | 43.4 |
| Ethylene thiourea | 47.7 |
| 2,4-diaminophenol dihydrochloride | 8.6 |

The additives which are set forth in Table II were added to each of the test solutions in the concentration indicated in Table II. Test specimens were prepared in exactly the same manner as indicated in Examples 1 through 10. Each of the etching solutions were applied for five minutes to each of the test specimens in the manner indicated in Examples 1 through 10. After this period, the etching rates were determined in the same manner as indicated in Examples 1 through 10. These results are indicated in Table II.

TABLE II.—RELATION OF ADDITIVES TO ETCH BATH OF A FERRIC CHLORIDE ETCHING BATH CONTAINING A FILM-FORMING AGENT

| Example | Additive tested | Additive concentration (moles of additives per liter of 30° Bé. $FeCl_3$ sol.) | Film-former concentration (gm./liter) | Etch rate (inch/minute) |
|---|---|---|---|---|
| 11 (control) | None | None | 2.8 | 0.0010 |
| 12 | Monochloro acetic acid. | 0.05 | 2.8 | 0.0013 |
| 13 | Bromoacetic acid | 0.05 | 2.8 | 0.0017 |
| 14 | Dibromo acetic acid. | 0.05 | 2.8 | 0.0017 |
| 15 | Alpha chloro propionic acid. | 0.05 | 2.8 | 0.0016 |
| 16 | Sodium salt of chloro acetic acid. | 0.05 | 2.8 | 0.0016 |
| 17 | Sodium salt of chloro acetic acid. | 0.005 | 2.8 | 0.0016 |
| 18 | Sodium salt of chloro acetic acid. | 0.20 | 2.8 | 0.0016 |
| 19 | Sodium formate | 0.20 | 2.8 | 0.0016 |
| 20 | Potassium acetate. | 0.05 | 2.8 | 0.0013 |
| 21 | Sodium propionate. | 0.05 | 2.8 | 0.0014 |
| 22 | Pripionic acid | 0.05 | 2.8 | 0.0016 |
| 23 | Magnesium acetate. | 0.025 | 2.8 | 0.0016 |
| 24 | Tri chloro acetic acid. | 0.05 | 2.3 | 0.0014 |
| 25 | Cyano acetic acid | 0.05 | 2.3 | 0.0014 |
| 26 | Alpha chloro propionic acid. | 0.05 | 2.3 | 0.0017 |

As seen from the results in Table II, the additives of this invention increase the etch rate of an etching bath containing a film-forming agent by at least thirty percent when utilized in etching baths. As seen from this table, in some cases these additives increase the etch rate by approximately 70%.

Examples 27 through 32

Examples 27 through 32 demonstrate the improved etching rate obtained by means of the additive of this invention with various concentrations of copper ion in the etching bath.

In Examples 27 through 32 test specimens were prepared in the same manner as in Examples 1 through 10.

In Example 27 the test specimen was etched for five minutes with an aqueous solution of 30° Bé. $FeCl_3$ applied in the same manner and by the same apparatus as described in Examples 1 through 10.

In Example 28 the test specimen was etched for five minutes with an etching solution consisting of an aqueous 30° Bé. ferric chloride solution and an additive composed of a mixture of mono-chloro acetic acid and sodium acetate. The chloro acetic acid and sodium acetate were present in the etching solution to provide a concentration of 0.004 mole of chloro acetic acid per liter of 30° Bé. ferric chloride solution and 0.002 mole of sodium acetate per liter of 30° Bé. ferric chloride solution. The test plate was etched in the same manner and utilizing the same machine as outlined in Examples 1 through 10.

In Example 29 a test specimen was etched with a ferric chloride (30° Bé.) solution for a period of five minutes in the manner and utilizing the same machine as outlined in Examples 1 through 10. The ferric chloride solution which was utilized to etch this test specimen had a sufficient amount of copper etched therein so that the solution had a copper concentration of 0.75 gram per liter.

In Example 30 the same etching bath in Example 29 was utilized to etch a test specimen to Example 1, except that the etching solution had a mixture of chloro acetic acid and sodium acetate present in the etching bath. The chloro acetic acid and sodium acetate were present in an amount sufficient to provide a concentration of 0.004 mole of chloro acetic acid and 0.002 mole of sodium acetate per liter of 30° Bé. ferric chloride. The test specimen was etched in the same manner as utilized in the same machine as described in Examples 1 through 10.

In Example 31 a test specimen such as prepared in Examples 1 through 11 were etched for five minutes with a ferric chloride (30° Bé.) solution, having copper etched therein to provide a concentration in the bath of 3.0 grams per liter. The test specimen was etched in the same manner, utilizing the same apparatus as that recited in Examples 1 through 10.

In Example 32 a test specimen was etched for five minutes with a ferric chloride etching solution described in Example 31, except that this etching solution contained a mixture of monochloro acetic acid and sodium acetate in a concentration of 0.004 mole of chloro acetic acid per liter of 30° Bé. ferric chloride etching solution and 0.002 mole of sodium acetate per liter of 30° Bé. etching solution. The plate was etched with this solution in the same manner, utilizing in the same apparatus as in Examples 1 through 10.

After etching with the above solutions for five minutes, the etching rate for each of these solutions was determined. The etching rate was determined in the manner described in Examples 1 through 10. The results of the etching rate of these solutions is reported in Table III.

TABLE III.—THE RESULT OF THE ETCHING RATE OF FERRIC CHLORIDE SOLUTIONS UTILIZING THE ADDITIVES OF THIS INVENTION AS RELATED TO THE COPPER CONCENTRATION IN THE ETCHING SOLUTION

| Example | Copper concentration (g./l.) | Additive present | Etch rate (in./min.) |
|---|---|---|---|
| 27 | 0 | None | 0.0014 |
| 28 | 0 | Chloro acetic acid plus sodium acetate. | 0.0018 |
| 29 | 0.75 | None | 0.0012 |
| 30 | 0.75 | Chloro acetic plus sodium acetate. | 0.0017 |
| 31 | 3 | None | 0.0008 |
| 32 | 3 | Chloro acetic acid and sodium acetate. | 0.00149 |

As seen from the above table the use of additives of this invention, especially where there is a high copper concentration present in the bath, increases etch rate substantially, in some cases by as much as 70%, when utilized in an etching bath. This is seen by comparing the results of Examples 27, 29 and 30 where no additive was utilized with that of Examples 28, 30 and 32 where the additives of this invention were utilized. The importance of the results shown in Table I is seen by the fact that during the etching procedure the copper concentration in the bath increases due to the etching process. By means of utilizing the additives of this invention, the substantial loss in etching rate due to the accumulation of copper ion in the etching bath will be substantially limited.

Examples 33 through 38

Examples 33 through 38 demonstrate the ineffectiveness of an organic mono-carboxylic acid which contains only a beta halogenated carbon atom when utilized as an additive in an etching bath.

Test copper specimens were prepared in the manner recited in Examples 1 through 10. The specimens each had a thickness of 0.065 inch. Each of these specimens which were first weighed, were separately placed in a aqueous 30° Bé. ferric chloride solution in the following manner. The ferric chloride solutions contained an additive such as designated in Table IV, except the solution which was utilized as a control. The work samples were suspended face down in a beaker containing the 30° Bé. aqueous solution of ferric chloride about 2" above the bottom of the beaker. A magnetic stirrer was used to stir the solution. The samples remained in the beaker for a period of 30 minutes while the temperature was maintained at about 70° F. After 30 minutes, the specimens were removed from the solution, dried and weighed. The difference in the weight loss per gram of the original sample was determined by subtracting the weight of the sample after 30 minutes in the etching solution from the original weight of the sample. The differences in weight loss per gram of original sample weight is indicative of the differences in the etching rate for each sample. The weight loss per gram of original sample is set forth in Table IV.

TABLE IV.—ETCH RATE WITH PLATE IMMERSED IN THE ETCHING BATH

| Example | Additive | Additive concentration (moles of additives per liter of 30° Bé ferric chloride sol.) | Percent weight loss (percent) |
|---|---|---|---|
| 33 | None | None | 13.0 |
| 34 | Mono chloro acetic acid | 0.05 | 14.74 |
| 35 | Sodium salt of chloro acetic acid. | 0.05 | 13.94 |
| 36 | Sodium propionate | 0.05 | 13.82 |
| 37 | Beta chloro propionic acid | 0.05 | 9.7 |
| 38 | Alpha chloro propionic acid | 0.05 | 13.6 |

From the above table it is seen that the additives of this invention increase the etch rate of etching solutions upon copper plates. Furthermore, it is seen, from comparing sample Example 37 with Examples 33, 34, 35, 36 and 38 that the unique results of this invention are not achieved when a mono carboxylic acid only contains a chlorine atom substituted on the beta carbon atom of the carboxylic acid.

Examples 39 through 43

Examples 39 through 43 demonstrate that the additives of this invention reduce the depletion rate of film-forming agents in etching baths.

Separate etching baths, each containing the following composition, were formed:

| Component: | Amount |
|---|---|
| Ferric chloride 30° Bé. ____liter__ | 1 |
| Film Former (a mixture consisting of 43.4 parts by weight of formamidine disulfide dihydrochloride, 47.7 parts by weight of ethylene thiourea and 8.6 parts by weight of 2,4-diamino phenol dihydro chloride ____gram__ | 2.8 |

To all of these baths there was added an additive as shown in Table V, except the bath that was utilized as a control.

Test specimens were prepared in the manner indicated in Examples 1 through 10. The plates were etched in the manner and utilizing the apparatus described in Examples 1 through 10. Etching was carried out for a period of five minutes. The resulting etched plates all showed half-tone dots of initial diameter greater than 0.001 inch since these half-tone dots were retained during this etching period. The dots of smaller initial diameter were etched away during this period. After this period a sufficient amount of copper ion was etched into the bath to give a copper ion concentration in the bath of approximately two ounces per gallon, and the minimum amount of the film-former was added so that a test plate etched with this solution for five minutes utilizing the above procedure and apparatus would retain all half-tone dots of an initial diameter greater than 0.001 inch. This amount of film former was determined by adding small increments of film-former until a test plate etched under these conditions with this solution, retained all half-tone dots of an initial diameter greater than 0.001 inch.

After this "balancing" of the bath, sufficient copper ion was again etched into the bath to increase the copper concentration in the bath to three ounces per gallon. Test object plates were etched as described above until the smallest amount of film-former that was needed to be added to the bath, was then added to the bath until the concentration of the film-former so that 0.001 inch diameter half-tone dot would be retained on a test plate object was determined. From the amount of the film-former necessary to balance each bath the replenishment rate of each bath was determined. The replenishment rate which is given in Table V is the amount in grams of film-former required to rebalance the bath so that a 0.001 inch diameter half-tone dot was retained on the test plate, after etching for five minutes divided by the weight in grams of copper ion dissolved in the bath.

TABLE V.—RELATIONSHIP OF ADDITIVES TO THE REPLENISHMENT RATE OF A FILM-FORMING AGENT TO A FERRIC CHLORIDE ETCHING BATH

| Example | Additive used | Concentration (moles of additive/liter of 30° Bé. $FeCl_3$ sol.) | Replenishment rate (grams of film-former / grams of copper ion) |
|---|---|---|---|
| 39 | None | None | 1/8.5 |
| 40 | Alphachloro propionic acid | 0.05, 0.05 | 1/57.0 |
| 41 | Sodium formate | 0.05 | 1/41.5 |
| 42 | Sodium propionate | 0.05 | 1/40 |
| 43 | Chloroacetic acid and sodium acetate. | 0.04, 0.02 | 1/20 |

As seen from the results of Table V, the use of additives of this invention significantly increase the life of an etching bath wherein the need for replenishment of the film-forming agent is substantially reduced. This is seen by the fact that by utilizing additives in accordance with this invention, the amount of film-forming agent necessary to produce the same etching results as when the bath is initially utilized, is substantially reduced.

Examples 44 through 47

Examples 44 through 47 demonstrate that the additives of this invention prevent the decomposition and deterioration of the film-forming agent in an etching bath when the bath is allowed to stand overnight.

Test specimens were prepared in the same manner as described in Examples 1 through 10. The same etching bath that was utilized in Examples 39 through 43 was utilized in determining the overnight replenishment rate as set forth in Table V. The etching bath was applied to the test specimens in the manner and apparatus described in connection with Examples 1 through 10. Test specimens were etched for five minutes in this manner. After this etching procedure was carried out the test specimens retained all half-toned dots larger in initial diameter than 0.001 inch. Under these conditions the bath was considered balanced. After the plates were etched in this manner, the bath was allowed to stand unused for 16 hours. A test plate was then etched for five minutes and examined. Sufficient additional film-forming agent was then added by means of the procedure described in Examples 39 through 43 until a plate etched for five minutes in the manner hereinbefore described retained dots larger than 0.001 inch. The minimum amount of film-forming agent required to accomplish this result was recorded. The minimum amount of film-forming agent per liter of 30° Bé. ferric chloride etching bath required to balance the bath after it had been allowed to stand for 16 hours is reported in Table VI. This is an index of the preservative effect of the various additives of this invention.

TABLE VI.—THE EFFECT OF VARIOUS ADDITIVES ON THE OVERNIGHT REPLENISHMENT RATE OF ETCHING BATH

| Example | Additive used | Concentration (moles of additive/liter of 30° Bé. $FeCl_3$ sol. bath) | Replishment rate (grams of film-former per liter of bath) |
|---|---|---|---|
| 44 | None | None | 1.9 |
| 45 | Alpha propionic acid | 0.05 | 1.5 |
| 46 | Sodium acetate | 0.05 | 1.7 |
| 47 | Sodium propionate | 0.05 | 1.5 |

As seen from the above table, the use of the additives of this invention significantly increases the life of an etching bath. This is shown by the fact that when the additives of this invention are added to a bath containing a film-forming agent, the depletion rate of the film-forming agent, when the bath is allowed to stand overnight, is sufficiently reduced. This is demonstrated by comparing the replenishment rate of etching baths utilizing the additives of this invention (Examples 45 through 47) with the replenishment rate of a bath of Example 44 where no additive was present.

What is claimed is:

1. In a process of etching photo-engraving copper to make therein an image in relief which comprises providing a copper plate having the image area exposed for etching, and contacting the image area with a 20° to 55° Bé. ferric chloride etching solution, the improvement which comprises including in the etching solution from about 1% to 25% by weight, a material selected from the group consisting essentially of halogenated monocarboxylic acids having at least one halogen group substituted on the alpha carbon and containing from about 2 to about 4 carbon atoms, cyano substituted monocarboxylic acids containing from about 2 to about 4 carbon atoms, propionic acid, alkali metal salts of monocarboxylic acids containing from about 1 to about 4 carbon atoms, alkali metal salts of halogenated carboxylic acids containing from about 2 to about 4 carbon atoms, alkaline earth metal salts of monocarboxylic acids containing from about 1 to about 4 carbon atoms, and mixtures thereof.

2. The process of claim 1 wherein said material is alpha halogenated mono carboxylic acid containing from about 2 to about 4 carbon atoms.

3. The process of claim 1 wherein said material is monochloro acetic acid.

4. The process of claim 1 wherein said material is alkali metal salt of a halogenated monocarboxylic acid containing from about 2 to about 4 carbon atoms.

5. The process of claim 1 wherein said material is an alkali metal salt of a mono carboxylic acid containing from about 1 to about 4 carbon atoms.

6. In a process of etching photo-engraving copper to make therein an image in relief which comprises providing a copper plate having the image area exposed for etching, and contacting the image area with an etching solution containing a 20° to 55° Bé. ferric chloride etching solution and including from about 0.5 to about 10 grams per liter of a film-forming agent selected from the group of formidene disulfide and thiourea compounds which tends in the etching environment to provide a protective film over the copper, the protective film being abraded in a manner to allow the film to continue to protect the image area from undercutting, the improvement which comprises including the etching solution from about 1% to about 25% by weight of a material which is selected from the group consisting of halogenated monocarboxylic acids having at least one halogen group substituted on the alpha carbon and containing from about 2 to about 4 carbon atoms, cyano substituted monocarboxylic acids containing from about 2 to about 4 carbon atoms, propionic acid, alkali metal salts of monocarboxylic acids containing from about 1 to about 4 carbon atoms, alkali metal salts of halogenated monocarboxylic acids containing from about 2 to about 4 carbon atoms, alkaline earth metal salts of monocarboxylic acids containing fro mabout 1 to about 4 carbon atoms, and mixtures thereof.

7. The process of claim 6 wherein said material is an alpha halogenated mono carboxylic acid containing from about 2 to about 4 carbon atoms.

8. The process of claim 6 wherein said material is mono chloro acetic acid.

9. The process of claim 6 wherein said material is trichloroacetic acid.

10. The process of claim 6 wherein said material is an alkali metal salt of a mono carboxylic acid containing from about 1 to about 4 carbon atoms.

11. A composition for use in powderless etching of photo-engraving copper comprising in admixture from about 25° to about 55° Bé. ferric chloride etching solution containing from about 1% to about 25% by weight a material selected from the group consisting essentially of halogenated monocarboxylic acids having at least one halogen group substituted on the alpha carbon and containing from about 2 to about 4 carbon atoms, cyano substituted monocarboxylic acids containing from about 2 to about 4 carbon atoms, propionic acid, alkali metal salts of monocarboxylic acids containing from about 1 to about 4 carbon atoms, alkali metal salts of halogenated monocarboxylic acids containing from about 2 to about 4 carbon atoms, alkaline earth metal salts of monocarboxylic acids containing from about 1 to about 4 carbon atoms, and mixtures thereof.

12. The composition of claim 11 wherein said material is an alpha halogenated mono carboxylic acid containing from about 2 to about 4 carbon atoms.

13. The composition of claim 11 wherein said material is mono carboxylic acid.

14. The composition of claim 11 wherein said material is an alkali metal salt of a mono carboxylic acid containing from about 1 to about 4 carbon atoms.

15. A composition for use in powderless etching of photo-engraving to provide a protective film around the periphery of the image area during the etching wherein the film has been modified so as to permit its abrasion from small areas of the image area so as to permit proper etching thereof comprising in admixture, from about 20° to about 55° Bé. of ferric chloride etching solution, from about 0.5 gram per liter to about 10 grams per liter of a film-forming agent selected from the group of formidene disulfide and thiourea compounds, and from about 1% to about 25% by weight of a material selected from the group consisting of halogenated monocarboxylic acids having at least one halogen group substituted on the alpha carbon and containing from about 2 to about 4 carbon atoms, cyano substituted mono carboxylic acids containing from about 2 to about 4 carbon atoms, propionic acid alkali metal salts of monocarboxylic acids containing from about 1 to about 4 carbon atoms, alkali metal salts of mono halogenated monocarboxylic acids containing from about 2 to about 4 carbon atoms, alkaline earth metal salts of carboxylic acids containing from about 1 to about 4 carbon atoms, and mixtures thereof.

16. The composition of claim 15 wherein said material is monochloroacetic acid.

17. The composition of claim 15 wherein said compound is monobromoacetic acid.

References Cited

UNITED STATES PATENTS 3,148,100 9/1964 Elston -------------- 156—14

JACOB H. STEINBERG, Primary Examiner

U.S. Cl. X.R.

252—79.4